C. B. Richards,
Shutter Fastener.
Nº 28,241.    Patented May 8, 1860.
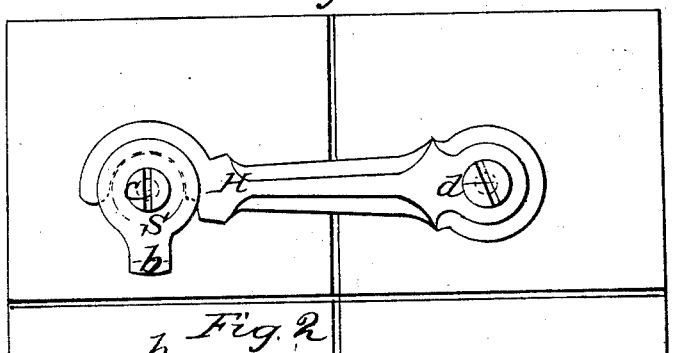
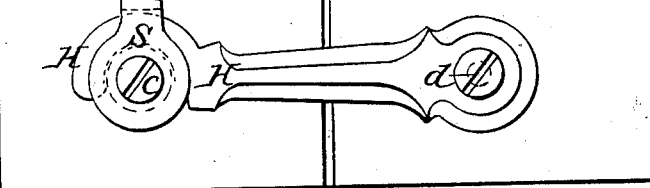
Witnesses:    Inventor:
Chas. T. Porter,    C. B. Richards.
Thomas B. De Forest

UNITED STATES PATENT OFFICE.

C. B. RICHARDS, OF BROOKLYN, NEW YORK, ASSIGNOR TO SAML. J. SEELY, OF NEW YORK, N. Y.

HOOK-CATCH FOR DOORS.

Specification of Letters Patent No. 28,241, dated May 8, 1860.

*To all whom it may concern:*

Be it known that I, C. B. RICHARDS, of Brooklyn, in the county of Kings and State of New York, have invented a new and useful Improvement in Hook-Catches for Doors, Windows, &c.; and I do hereby declare the following to be a full, clear, and exact description of the same, reference being had to the accompanying drawings, making a part thereof, in which—

Figure 1 is a front view of the hook-catch, S, as applied to a hook H; the parts of the said catch being here represented in such position that the end of the hook H may be lifted out of the catch S. Fig. 2 is a front view of the same, but with the parts of the catch S in such position that the end of the hook H is locked into, and cannot be lifted out of the catch. Fig. 3 is a perspective view of the improved hook catch.

Similar characters of reference denote the same part in the several figures.

My invention consists in combining with a properly shaped hook, a locking catch constructed, applied and operated substantially as hereinafter described, for the purpose of forming a simple, cheap and secure lock to fasten doors, windows and all other articles to which it is applicable.

To enable others to make and use my invention I will proceed to describe its construction and operation.

The catch S (see Fig. 3) is made as follows—$a$, is a short cylindrical hub formed with a flange $f$ at one end; this flange $f$ is elongated and has the end of such elongation turned at right angles to the plane of the said flange, and is thus formed into a hook $b$. Through the axis of the hub, $a$, is a hole for the securing of the catch, (formed as above described) by means of a common wood screw, or other equivalent means, to the door-casing, window shutter, or whatever else my invention may be applied to as a fastening. The head of the said screw is shown in Figs. 1 and 2 at, $c$. The catch S is so secured by the screw, $c$, as to be free to turn upon the said screw.

The hook H, is in general form like that of hooks in common use, and is pivoted to the door or window, on which it is used, at $d$. The lower side of its hooked end is so formed that it can rest upon the hub $a$ of the catch S when the hook catch is turned down as shown in Fig. 1; it then operating as a simple latch, and being held in place to prevent its being pushed or moved off of the catch sidewise by the projecting of the flange $f$.; and the upper side of the same so formed that the locking hook $b$ can be turned up over and on it to securely lock and fasten it (when the catch is turned up as shown in Fig. 2) so that it cannot be raised or lifted from the catch.

The advantages of the above described locking hook catch consist in its simplicity and cheapness, besides being compact, and readily adjusted to lock or unlock the hook to which it is applied.

It is apparent that the hook and catch may be used as a "night lock" to be operated from the exterior of a door, by so constructing the end of the hub $a$ as to allow it to be acted upon by a key to turn the catch, and by applying a spindle and knob to the hook to raise it from its catch when unlocked.

I am aware that locking devices have before been applied to the catches of latches, wherein the said locking devices are pivoted to the catch, above the latch, and are in a separate piece from the said catch.

I do not therefore claim as my invention a catch furnished with a device pivoted to any part of said catch for the purpose of locking the latch into its catch.

What I claim as my invention and desire to secure by Letters Patent is—

The combination of the hook H with the locking catch S, constructed, applied, and operated substantially as described, whereby the said catch can be operated to simply latch the hook in place, or to securely lock the same, as set forth.

C. B. RICHARDS,

Witnesses:
CHAS. T. PORTER,
H. D. GREEN.